(12) United States Patent
Andrews et al.

(10) Patent No.: US 8,661,669 B2
(45) Date of Patent: Mar. 4, 2014

(54) METHOD OF MAKING AND JOINING AN AEROFOIL AND ROOT

(75) Inventors: Ian J. Andrews, Willington (GB); David Rugg, Etwall (GB); Michael J. Wallis, Barrow (GB)

(73) Assignee: Rolls-Royce PLC, London (GB)

( * ) Notice: Subject to any disclaimer, the term of this patent is extended or adjusted under 35 U.S.C. 154(b) by 315 days.

(21) Appl. No.: 12/967,420

(22) Filed: Dec. 14, 2010

(65) Prior Publication Data

US 2011/0088261 A1  Apr. 21, 2011

Related U.S. Application Data

(62) Division of application No. 11/140,908, filed on Jun. 1, 2005, now abandoned.

(30) Foreign Application Priority Data

Jun. 10, 2004  (GB) .................................. 0412915.1

(51) Int. Cl.
*B21D 53/78*  (2006.01)

(52) U.S. Cl.
USPC .................... 29/889.7; 29/889.71; 29/889.72; 29/889.025; 29/525.14

(58) Field of Classification Search
USPC ............... 29/889.7, 889.71, 889.72, 888.025, 29/525.14; 416/232
See application file for complete search history.

(56) References Cited

U.S. PATENT DOCUMENTS

| | | | | |
|---|---|---|---|---|
| 2,754,203 A * | 7/1956 | Vordahl | ........................ | 420/421 |
| 3,466,908 A * | 9/1969 | Whiteford | ........................ | 72/58 |
| 3,623,204 A * | 11/1971 | Wagle | ............................ | 228/182 |
| 3,698,587 A * | 10/1972 | Baker et al. | ..................... | 428/63 |
| 3,737,125 A * | 6/1973 | Farmer | ........................ | 244/135 B |
| 3,768,147 A * | 10/1973 | Berry et al. | ................ | 228/112.1 |
| 3,854,194 A * | 12/1974 | Woodward | .................... | 228/194 |
| 3,957,194 A * | 5/1976 | Woodward | .................... | 228/194 |
| 3,980,106 A * | 9/1976 | Wiggins | ........................ | 138/140 |
| 4,012,616 A * | 3/1977 | Zelahy | ........................... | 219/603 |
| 4,096,296 A * | 6/1978 | Galmiche et al. | .............. | 427/247 |
| 4,115,616 A * | 9/1978 | Heitz et al. | .................... | 442/224 |
| 4,144,433 A * | 3/1979 | Zelahy et al. | ................. | 219/603 |
| 4,216,803 A * | 8/1980 | Hall | .............................. | 138/144 |

(Continued)

FOREIGN PATENT DOCUMENTS

| | | | | |
|---|---|---|---|---|
| CA | 1076334 A | 4/1980 | | |
| EP | 1188497 A2 * | 3/2002 | ............ | B21D 26/02 |

(Continued)

OTHER PUBLICATIONS

European Search Report (dated Jul. 16, 2004 in corresponding GB application).

(Continued)

*Primary Examiner* — David Bryant
*Assistant Examiner* — Bayan Salone
(74) *Attorney, Agent, or Firm* — Jeffrey S. Melcher; Manelli Selter PLLC

(57) ABSTRACT

A ducted fan gas turbine engine aerofoil is made by electron beam welding together at least two metal sheets (10) and (12) and electron beam welding that sub assembly via an end to a root that has been manufactured in a separate operation, and then heating the whole to a temperature that will convert the electron beam welds to diffusion bonds.

16 Claims, 1 Drawing Sheet

(56) References Cited

U.S. PATENT DOCUMENTS

| | | | | |
|---|---|---|---|---|
| 4,318,672 A * | 3/1982 | Hansen | 416/224 |
| 4,345,698 A * | 8/1982 | Villemain | 220/560.02 |
| 4,368,086 A * | 1/1983 | Villemain | 156/93 |
| 4,592,120 A * | 6/1986 | Egan et al. | 29/889.21 |
| 4,796,343 A * | 1/1989 | Wing | 29/889.21 |
| 4,839,237 A * | 6/1989 | Coulon et al. | 428/610 |
| 4,883,216 A * | 11/1989 | Patsfall | 228/119 |
| 4,886,225 A * | 12/1989 | Bates | 244/135 R |
| 4,925,057 A * | 5/1990 | Childress et al. | 244/135 R |
| 5,041,182 A * | 8/1991 | Sekiguchi et al. | 156/245 |
| 5,118,571 A * | 6/1992 | Petersen | 428/586 |
| 5,165,859 A * | 11/1992 | Monroe | 416/224 |
| 5,197,190 A * | 3/1993 | Coolidge | 29/889.1 |
| 5,226,578 A * | 7/1993 | Douglas | 228/157 |
| 5,240,376 A * | 8/1993 | Velicki | 416/229 A |
| 5,243,758 A * | 9/1993 | LeMonds et al. | 29/889.72 |
| 5,261,940 A * | 11/1993 | Berczik | 75/236 |
| 5,263,638 A * | 11/1993 | Douglas | 228/118 |
| 5,273,202 A * | 12/1993 | Douglas | 228/44.3 |
| 5,285,573 A * | 2/1994 | LeMonds et al. | 29/889.72 |
| 5,323,536 A * | 6/1994 | Fowler et al. | 29/889.72 |
| 5,344,063 A * | 9/1994 | Johnston et al. | 228/157 |
| 5,363,554 A * | 11/1994 | Partridge et al. | 29/889.71 |
| 5,363,555 A * | 11/1994 | Fowler et al. | 29/889.72 |
| 5,383,567 A * | 1/1995 | Sorathia et al. | 220/4.13 |
| 5,384,959 A * | 1/1995 | Velicki | 29/889.72 |
| 5,390,413 A * | 2/1995 | Pratt | 29/889.21 |
| 5,447,582 A * | 9/1995 | Eylon et al. | 148/669 |
| 5,448,828 A * | 9/1995 | Willems et al. | 29/889.1 |
| 5,469,618 A * | 11/1995 | LeMonds et al. | 29/889.72 |
| 5,484,977 A * | 1/1996 | Douglas | 219/121.13 |
| 5,503,532 A * | 4/1996 | Schilling | 416/233 |
| 5,558,728 A * | 9/1996 | Kobayashi et al. | 148/421 |
| 5,573,604 A * | 11/1996 | Gerdes | 148/237 |
| 5,611,944 A * | 3/1997 | Gilkinson et al. | 219/117.1 |
| 5,729,901 A * | 3/1998 | Fowler et al. | 29/889.72 |
| 5,873,703 A * | 2/1999 | Kelly et al. | 416/241 R |
| 5,876,183 A * | 3/1999 | Furlan et al. | 416/213 R |
| 5,896,658 A * | 4/1999 | Calle et al. | 29/889.72 |
| 5,939,213 A * | 8/1999 | Bowden et al. | 428/608 |
| 5,994,666 A * | 11/1999 | Buldhaupt et al. | 219/121.64 |
| 6,264,091 B1 * | 7/2001 | Milburn | 228/157 |
| 6,418,619 B1 * | 7/2002 | Launders | 29/889.7 |
| 6,419,146 B1 * | 7/2002 | Buldhaupt et al. | 228/193 |
| 6,467,168 B2 * | 10/2002 | Wallis | 29/889.72 |
| 6,508,394 B1 * | 1/2003 | Buldhaupt et al. | 228/157 |
| 6,616,408 B1 * | 9/2003 | Meier | 416/193 A |
| 6,656,603 B2 * | 12/2003 | Buldhaupt et al. | 428/593 |
| 6,669,447 B2 * | 12/2003 | Norris et al. | 416/224 |
| 6,739,049 B2 * | 5/2004 | Nicholson | 29/889.72 |
| 6,802,122 B2 * | 10/2004 | Milburn | 29/889.72 |
| 6,814,820 B2 * | 11/2004 | Ozbaysal | 148/671 |
| 6,871,398 B2 * | 3/2005 | Richardson et al. | 29/889.72 |
| 6,983,575 B2 * | 1/2006 | Longo | 53/432 |
| 7,025,568 B2 * | 4/2006 | Jones | 416/90 R |
| 7,090,463 B2 * | 8/2006 | Milburn et al. | 415/211.2 |
| 7,169,452 B1 * | 1/2007 | Monk et al. | 428/35.7 |
| 7,216,694 B2 * | 5/2007 | Otero et al. | 164/516 |
| 7,237,709 B2 * | 7/2007 | Beckford | 228/157 |
| 7,364,801 B1 * | 4/2008 | Hazel et al. | 428/632 |
| 7,381,287 B2 * | 6/2008 | Monk et al. | 156/256 |
| 7,393,572 B1 * | 7/2008 | Monk et al. | 428/35.7 |
| 7,441,585 B2 * | 10/2008 | Otero et al. | 164/369 |
| 7,441,691 B2 * | 10/2008 | Franchet et al. | 228/157 |
| 7,469,739 B2 * | 12/2008 | Otero et al. | 164/516 |
| 7,526,862 B2 * | 5/2009 | Leveque et al. | 29/889.7 |
| 7,761,990 B2 * | 7/2010 | Ellis et al. | 29/889.1 |
| 7,794,808 B2 * | 9/2010 | Dudt et al. | 428/36.9 |
| 7,805,839 B2 * | 10/2010 | Cammer | 29/889.7 |
| 7,874,791 B2 * | 1/2011 | Ferber et al. | 415/137 |
| 7,896,221 B2 * | 3/2011 | Wallis | 228/194 |
| 7,900,333 B2 * | 3/2011 | Tweet et al. | 29/428 |
| 7,901,750 B2 * | 3/2011 | Atwood et al. | 428/34.1 |
| 7,997,473 B2 * | 8/2011 | Bray et al. | 228/112.1 |
| 8,006,380 B2 * | 8/2011 | Rawson et al. | 29/889.1 |
| 8,043,676 B2 * | 10/2011 | Ohnstad et al. | 428/35.7 |
| 8,056,227 B2 * | 11/2011 | DeMania et al. | 29/889.21 |
| 8,091,419 B2 * | 1/2012 | Vontell et al. | 73/147 |
| 8,158,903 B2 * | 4/2012 | Meier | 219/121.63 |
| 8,162,202 B2 * | 4/2012 | Milburn | 228/234.1 |
| 8,182,233 B2 * | 5/2012 | Goldfinch et al. | 416/229 R |
| 8,241,004 B2 * | 8/2012 | Strother | 416/232 |
| 8,251,640 B2 * | 8/2012 | Beckford et al. | 415/9 |
| 2001/0022023 A1 * | 9/2001 | Wallis | 29/889.72 |
| 2002/0011540 A1 * | 1/2002 | De Castro Nodal et al. | 244/45 R |
| 2002/0012587 A1 * | 1/2002 | Farrar et al. | 415/220 |
| 2002/0174540 A1 * | 11/2002 | Milburn | 29/889.7 |
| 2004/0118903 A1 * | 6/2004 | Richardson et al. | 228/193 |
| 2005/0278950 A1 * | 12/2005 | Despreaux et al. | 29/889.71 |
| 2006/0021222 A1 * | 2/2006 | Andrews et al. | 29/889.72 |
| 2006/0068214 A1 * | 3/2006 | Gigliotti et al. | 428/527 |
| 2007/0009694 A1 * | 1/2007 | Monk et al. | 428/35.7 |
| 2008/0178456 A1 * | 7/2008 | Rice et al. | 29/521 |
| 2008/0264951 A1 * | 10/2008 | Tweet et al. | 220/560.02 |
| 2009/0293447 A1 * | 12/2009 | Roth-Fagaraseanu et al. | 60/39.091 |
| 2011/0088261 A1 * | 4/2011 | Andrews et al. | 29/889.7 |
| 2011/0253726 A1 * | 10/2011 | Monk et al. | 220/560.02 |

FOREIGN PATENT DOCUMENTS

| | | | | |
|---|---|---|---|---|
| GB | 2180981 A | | 4/1987 | |
| GB | 2193125 A | | 2/1988 | |
| GB | 2304613 A | * | 3/1997 | B21D 26/02 |
| GB | 2310463 A | | 8/1997 | |

OTHER PUBLICATIONS

European Search Report (dated Jun. 30, 2010 in corresponding EP application).

European Office Communication for corresponding EP application (dated Oct. 12, 2011).

* cited by examiner

METHOD OF MAKING AND JOINING AN AEROFOIL AND ROOT

CROSS-REFERENCE TO RELATED APPLICATIONS

This application is a divisional of U.S. application Ser. No. 11/140,908, filed 1 Jun. 2005 and currently pending, which claims priority to GB 0412915.1, filed 10 Jun. 2004.

BACKGROUND OF THE INVENTION

The present invention relates to the manufacture of aerofoil blades of the kind used in ducted fan gas turbine engines, wherein the aerofoils are located via respective roots, in and about the rim of a rotary disk within a ducted fan gas turbine engine.

More specifically, the present invention has best efficacy where used in the manufacture of gas turbine engine fan blades, the aerofoils of which are hollow.

It is known to manufacture a hollow fan blade by forming two half aerofoils, one of which provides a concave exterior surface, and the other of which provides a convex exterior surface, and both include a half root portion. The formed halves are then placed in a die and heated so as to enable diffusion bonding of the halves and super-plastic expansion and separation in known manner of the interior surfaces of the joined aerofoils to cause movement of the aerofoils into their respective curved forms.

SUMMARY OF THE INVENTION

The present invention seeks to provide an improved method of making and joining a hollow aerofoil and root.

According to the present invention there is provided a method of making an at least substantially hollow aerofoil having a separately manufactured root comprises the steps of welding at least two metal sheets together about their edges, manufacturing a root having a surface shaped to receive an end of said joined sheets, welding said end to said surface, and then holding the resulting assembly in holding means via said sheets and heating the assembly to convert the weld joints to diffusion bonds.

BRIEF DESCRIPTION OF THE DRAWINGS

The invention will now be described by way of example and with reference to the accompanying drawings in which.

DETAILED DESCRIPTION OF THE INVENTION

Figure 1:
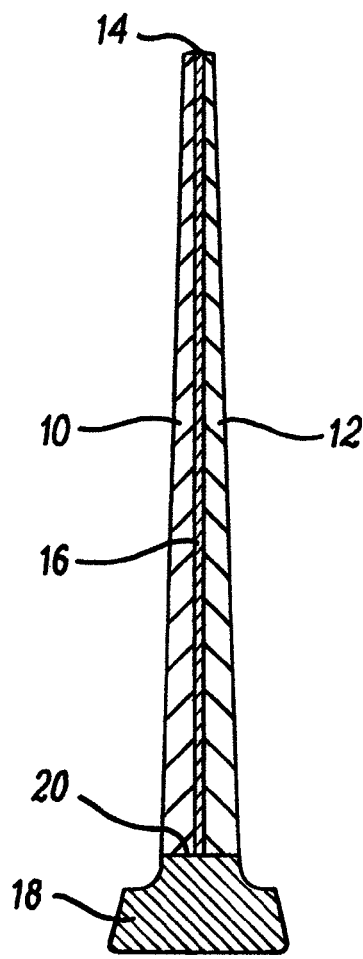
FIG. 1 is a longitudinal cross section through an aerofoil on line 1-1 of FIG. 2.
Figure 2:
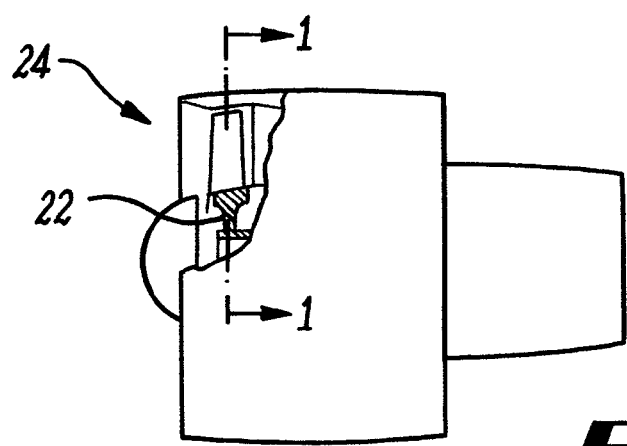
FIG. 2 is a diagrammatic sketch of a ducted fan gas turbine engine including a stage of fan aerofoils in accordance with the present invention.

Referring to FIG. 1. two sheets of metal, 10 and 12, which may be titanium or aluminium, are welded together around their edges 14. A third, much thinner metal sheet 16 of the same material as sheets 10 and 12, is trapped between sheets 10 and 12, and is further fixed by the weld referred to hereinbefore. A root member 18 that has been manufactured separate from the sheets 10, 12 and 16, is provided with a surface 20 to which, via an end, the assembly of sheets 10, 12 and 16 is fixed by e.g. electron beam welding, or linear friction welding. Root member 18 is so shaped as to be a sliding fit in a respective groove in the rim of a fan disk 22 of engine 24 in FIG. 2.

All of the parts making up the assembly are of a common material e.g. titanium or aluminium, and in the present example of the invention, it is intended that they be diffusion bonded after the welding operation. However, where thin plate 16 is used, lengthwise strip portions thereof are later required to stretch in opposing directions laterally of the sheet length, so as to provide a stiffening member for the aerofoil.

Therefore, a number of strips of a diffusion bond preventative such as Yttria are glued on to each side of sheet 16 prior to its insertion between sheets 10 and 12.

When the assembly is completed as described so far, it is placed in a suitable die which will enable forming sheets 10 and 12 into an aerofoil shape, and subjected to heat and temperature, the magnitudes of both of which are well known in the diffusion bonding and super-plastic forming field. Piping is connected to the interior of the sheets and an inert gas pumped in so as to cause sheets 10 and 12 to move away from each other to form the aerofoil shape dictated by the die, and simultaneously pull spaced portions of sheet 16 in opposing directions, to form the stiffening member. Also effected is the conversion of all of the welded joints peripherally of the sheets and between the ends of the sheets and root 18 to diffusion bonds, wherein material from each part migrates across the joint interface and eliminates it.

Attaching the root 18 to sheets 10, 12 and 16 at the stage in the process described provides the advantage that the following diffusion bonding process relieves stresses that are generated in the joint area during welding, thus obviating the need to perform a separate operation to achieve that effect. Further, it has been found that the resulting strength of the finished article is such that thinner sheets may be used without detriment.

Exclusion of sheet 16 will enable the manufacture of a completely hollow aerofoil having a root attached in the manner as described with reference to FIG. 1. In this example, that surface on one of the sheets that will be an interior surface when the two sheets are assembled, will have yttria applied to that area not required to diffusion bond.

An alternative method of manufacturing an aerofoil blade and root, is to weld sheets 10 and 12, or sheets 10, 12 and 16 together as described hereinbefore, and then super-plastically form them into the desired aerofoil shape, prior to welding them to root 18. The finished aerofoil can then be welded to root 18. The whole will then be heated to achieve conversion of the root weld to a diffusion bond, again as described hereinbefore.

A further alternative method of manufacturing an aerofoil blade and root, is to weld sheets 10 and 12, or weld sheets 10 and 12 and 16, together as described hereinbefore, and then to diffusion bond them together, prior to welding them to the root 18. The sheets 10 and 12, or the sheets 10, 12 and 16 are then super-plastically formed into the desired aerofoil shape. The heating used by the super-plastic forming process relieves stresses in the joint area during welding and to form a diffusion bond.

The invention claimed is:

1. A method of making an at least substantially hollow aerofoil having a separately manufactured root for locating the hollow aerofoil on a rotor disk, the method comprising the steps of:

providing at least two metal sheets having edges;
thereafter, welding the at least two metal sheets together about their edges to form a weld joint;

thereafter, placing the at least two metal sheets in a die having inner opposed respective aerofoil suction and pressure surfaces;

thereafter, heating the at least two metal sheets and subjecting the interior thereof to a pressure sufficient to expand the metal sheets into the respective die inner surfaces so as to adopt an aerofoil form and to convert the weld joint between the joined metal sheets to a diffusion bond;

manufacturing a root having a surface shaped to receive an end of said joined metal sheets;

thereafter, welding said end of the diffusion bonded metal sheets to said surface of the root to form an assembly having a weld joint; and thereafter, heating the diffusion bonded metal sheets and root assembly to convert the weld joint between the diffusion bonded metal sheets and the root to a diffusion bond.

2. A method of making an at least substantially hollow aerofoil according to claim 1, wherein only two metal sheets are used in the making of said aerofoil, at least one of which has a diffusion bond preventing material applied all over that surface which on assembly of the two metal sheets defines an interior surface of said assembly.

3. A method of making an at least substantially hollow aerofoil according to claim 1, wherein three metal sheets are used in the making of said aerofoil, the central metal sheet being thinner than the outer metal sheets, the central sheet having strips of diffusion bond preventing material applied to both sides thereof, the positions of said strips on one side of said central metal sheet being staggered with respect to the positions of the strips on the other side of the central metal sheet.

4. A method of making an at least substantially hollow aerofoil according to claim 1, wherein the welding of said end of the joined metal sheets to said surface of the root comprises election beam welding and friction welding.

5. A method of making an at least substantially hollow aerofoil according to claim 2, comprising pumping an inert gas between the metal sheets so as to expand the metal sheets against respective opposing inner surfaces of said die and cause them to adopt a corresponding aerofoil form.

6. A method of making an at least substantially hollow aerofoil according to claim 3, comprising pumping an inert gas between each outer metal sheet and the respective opposing sides of said central metal sheet so as to expand said outer metal sheets against respective opposing inner surfaces of said die and cause them to adopt a corresponding aerofoil form and to cause portions of the central metal sheet to superplastically extend in a staggered manner so as to form an aerofoil stiffening structure.

7. A method of making an at least substantially hollow aerofoil having a separately manufactured root for locating the hollow aerofoil on a rotor disk, the method comprising the steps of:

providing at least two metal sheets having edges;

thereafter, welding the at least two metal sheets together about their edges;

thereafter, diffusion bonding the welded metal sheets together;

manufacturing a root having a surface shaped to receive an end of said joined metal sheets;

thereafter, welding said end of the diffusion bonded metal sheets to said surface of the root to form an assembly having a weld joint;

thereafter, placing the diffusion bonded metal sheets and root assembly in a die having inner opposed respective aerofoil suction and pressure surfaces; and thereafter, heating the diffusion bonded metal sheets and root assembly and subjecting the interior thereof to a pressure sufficient to expand the metal sheets into the respective die inner surfaces so as to adopt an aerofoil form and to convert the weld joint between the diffusion bonded metal sheets and the root to a diffusion bond.

8. A method of making an at least substantially hollow aerofoil according to claim 7, wherein only two metal sheets are used in the making of said aerofoil, at least one of which has a diffusion bond preventing material applied all over that surface which on assembly of the two metal sheets defines an interior surface of said assembly.

9. A method of making an at least substantially hollow aerofoil according to claim 7, wherein three metal sheets are used in the making of said aerofoil, the central metal sheet being thinner than the outer metal sheets, the central sheet having strips of diffusion bond preventing material applied to both sides thereof, the positions of said strips on one side of said central metal sheet being staggered with respect to the positions of the strips on the other side of the central metal sheet.

10. A method of making an at least substantially hollow aerofoil according to claim 7, wherein the welding of said end of the joined metal sheets to said surface of the root comprises election beam welding and friction welding.

11. A method of making an at least substantially hollow aerofoil according to claim 8, comprising pumping an inert gas between the metal sheets so as to expand the metal sheets against respective opposing inner surfaces of said die and cause them to adopt a corresponding aerofoil form.

12. A method of making an at least substantially hollow aerofoil according to claim 9, comprising pumping an inert gas between each outer metal sheet and the respective opposing sides of said central metal sheet so as to expand said outer metal sheets against respective opposing inner surfaces of said die and cause them to adopt a corresponding aerofoil form and to cause portions of the central metal sheet to superplastically extend in a staggered manner so as to form an aerofoil stiffening structure.

13. A method of making an at least substantially hollow aerofoil having a separately manufactured root for locating the hollow aerofoil on a rotor disk, the method comprising the steps of:

a) providing at least two metal sheets having edges;
b) welding the at least two metal sheets together about their edges;
c) diffusion bonding the welded metal sheets together;
d) manufacturing a root having a surface shaped to receive an end of said joined metal sheets;
e) welding said end of the diffusion bonded metal sheets to said surface of the root to form an assembly;
f) placing the metal sheets in a die having inner opposed respective aerofoil suction and pressure surfaces;
g) heating the metal sheets and subjecting the interior thereof to a pressure sufficient to expand the metal sheets into the respective die inner surfaces so as to adopt an aerofoil form; and
h) converting the welded joint between the diffusion bonded metal sheets and the root to a diffusion bond.

14. A method of making an at least substantially hollow aerofoil according to claim 13, comprising performing step f) before step c), performing steps c) and g) concurrently and performing step h) after steps c) and g).

15. A method of making an at least substantially hollow aerofoil according to claim 13, comprising performing steps e), f) and g) sequentially and performing steps g) and h) concurrently.

16. A method according to claim 13, wherein the metal sheets comprise aluminum or titanium.

* * * * *